US006383534B1

(12) United States Patent
Dyrr et al.

(10) Patent No.: US 6,383,534 B1
(45) Date of Patent: May 7, 2002

(54) MINERAL WATER COMPOSITION

(76) Inventors: Lorin Dyrr, 11773 Stoney Peak Dr., #2813, San Diego, CA (US) 92128; Seymour Thomas, 133 S. Cordova St., Alhambra, CA (US) 91801

( * ) Notice: Subject to any disclaimer, the term of this patent is extended or adjusted under 35 U.S.C. 154(b) by 0 days.

(21) Appl. No.: 09/484,736

(22) Filed: Jan. 18, 2000

(51) Int. Cl.[7] .................................................. A23L 2/00
(52) U.S. Cl. ......................................... 426/74; 426/590
(58) Field of Search ............................ 426/74, 66, 590; 424/439

(56) References Cited

U.S. PATENT DOCUMENTS

| | | | | |
|---|---|---|---|---|
| 4,133,903 A | * | 1/1979 | Thiele et al. ................ | 426/590 |
| 4,528,200 A | * | 7/1985 | Coleman ..................... | 426/74 |
| 4,814,172 A | * | 3/1989 | Chavkin et al. ........... | 424/195.1 |
| 5,494,664 A | | 2/1996 | Brassart et al. ............. | 424/93.4 |
| 5,559,152 A | | 9/1996 | Komissarova et al. ...... | 514/557 |
| 5,605,697 A | | 2/1997 | Asano et al. ................ | 424/439 |
| 5,612,026 A | | 3/1997 | Dichl ....................... | 424/78.01 |
| 5,698,437 A | * | 12/1997 | Matsuda ..................... | 435/244 |
| 5,824,353 A | | 10/1998 | Tsunoda et al. .............. | 426/66 |
| 5,843,922 A | | 12/1998 | Whistler et al. .............. | 514/61 |

FOREIGN PATENT DOCUMENTS

| | | | |
|---|---|---|---|
| EP | 0 205 634 B1 | 3/1988 | ............. A23L/2/38 |
| WO | WO 99/29631 | 6/1999 | ............. C02F/1/64 |

OTHER PUBLICATIONS

Derwent Abstract No. 1998–378485.*
Nielsen, F.H. in Prasad, A.S., ed., "Essential and Toxic Trace Elements in Human Health and Disease: An Update." pp. 355–376, New York: Wiley–Liss, (1993).
Kurmann et al., "Bifidobacteria in Foods,"Encyclopedia of Food and Science, Food Technology and Nutrition, McRai et al., eds., pp. 374–378 (1993–.
Hughes et al., "Bifidobacteria: Their Potential For Use In American Dairy Products," Food Technology, pp. 74–81 (Apr., 1991).

* cited by examiner

Primary Examiner—Carolyn Paden

(57) ABSTRACT

A mineral water composition comprising a blend of minerals and trace elements, a bifidobacterium probiotic agent, at least one carboxylic acid, and at least one mineral acid. Embodiments of the composition further comprises silica and ascorbic acid. The mineral water compositions can be ingested as a concentrate or diluted into beverages or other foods.

38 Claims, No Drawings

MINERAL WATER COMPOSITION

FIELD OF THE INVENTION

The present invention relates generally to a consumable mineral water composition containing a blend of minerals and trace elements, a probiotic agent that selectively promotes growth of bifidobacterium over other intestinal flora, and further contains a mineral acid and a carboxylic acid; and may further contain ascorbic acid and silica.

BACKGROUND

The need for minerals and trace elements are well known in the nutritional and holistic arts. Potassium, sodium, calcium, and magnesium ions are the predominant metal ions in the cytoplasm of a cell. Many of these minerals and trace elements are used as cofactors, activators, or stabilizers bound to enzymes, proteins, nucleic acids or other biochemicals. Calcium ion combines with phosphate ion to comprise bone matrix. Iron is at the center of a heme group that make up hemoglobin, a metalloprotein that binds oxygen for respiration. Magnesium or manganese ion binds with adenosine triphosphate (ATP) to form the absolutely required substrate used in most ATP-dependent enzymatic reactions. The trace element selenium is required by the enzyme superoxide dismutase for effective catalysis. Fluoride binds to the enamel of your teeth, thereby inhibiting tooth decay. Iodine is another trace element needed for proper function of the thyroid gland. Silicon is an essential element required for normal growth development, especially with bones and connective tissue (Nielsen, F. H. in Prasad, A. S., ed. Essential and Toxic Trace Elements in Human Health and Disease: An Update:355–376. New York: Wiley-Liss, 1993).

Proper intestinal health, such as that brought on by certain intestinal microorganisms, helps the intestine to absorb those minerals and trace elements that the body minimally requires. Without a healthy intestine, the body often reacts with diarrhea that not only depletes water from the system, thereby creating dangerous levels of dehydration, but also a loss of minerals and trace elements. A substantial loss of electrolytes during diarrhea can cause death.

Bifidobacteria are one component of the intestinal flora of man and other mammals. These bacteria are not pathogenic, but are known to inhibit other pathogenic, intestinal bacteria because of their ability to produce acetic acid, lactic acid, and propionic acid, a known antimicrobial. They are also known to produce bioactive compounds that provide protective health benefits to their hosts. It is well known in the art that having a dominating culture of bifidobacteria in the intestine can improve health. For instance, it has been noted that breast-fed neonates have mostly pure cultures of bifidobacteria in their intestines and are therefore less susceptible to enteral infection compared to bottle-fed neonates that have sparse populations of bifidobacteria. Other U.S. patents (Brassart, et al., U.S. Pat. No. 5,494,664, issued Feb. 27, 1996) have proposed ingestion of pure cultures of Bifidobacteria species to establish and maintain proper intestinal health. Some have proposed that bifidobacteria have an immuno-potentiating effect, and a prophylactic effect that arises from the competitive microbial exclusion that results in a decreased production of toxins and carcinogenic substances from pathogenic bacteria.

There is a need to promote the growth of intestinal bifidobacteria, so that the potential health-inducing effects can be exploited by the users. This has fueled the need for continuing research in the field of chemicals and conditions, essentially "bifidus growth factors" that encourage the preferential growth of intestinal bifidobacteria.

The two recognized requirements for a bifidus growth factor are that it: 1) not be digested and absorbed in the upper digestive tract but reaches the ileum and large colon, where the bifidobacteria are located; and, 2) that it be efficiently metabolized by bifidobacteria and under-utilized or not utilized by other intestinal bacteria. Most prior work on bifidus growth factors has focused on the use and incorporation of oligosaccharides, specifically fructo-oligosaccharides, into various kinds of foodstuffs and drinks.

However, oligosaccharides have not generally fulfilled the requirements for a bifidus growth factor. For instance, fructo-oligosaccharides have the disadvantage that they are broken down by stomach acids (hydrochloric acid) and are partly absorbed in the small intestines. Other candidates, such as isomalto-oligosaccharides are mostly digested and absorbed in the small intestine prior to reaching the bifidobacterium resident in the colon. Conversely, galacto-oligosaccharides are mostly undigested and unabsorbed prior to the colon, but instead suffer from economic disadvantages relating to high production costs resulting from low manufacturing yields, thereby becoming commercially non-viable.

The low selectivity of bifidobacterium for all three of the aforementioned oligosaccharides relative to their utilization by the other intestinal flora is not ideal. As a result, there must be a large intake of oligosaccharides to achieve the desired effect upon the bifidobacteria in the colon. Thus, the growth of bifidobacteria varieties and competing bacteria is promoted simultaneously, resulting in a less than optimum ratio of bifido to other species. This situation has created a need for a better probiotic agent to selectively promote the growth of bifidobacteria in the alimentary tract.

In the instant invention, the concept of using a mineral water blend combined with a selective bifidobacterium probiotic agent to improve intestinal, as well as overall health is believed to be novel.

There is therefore a need to provide a new composition comprised of a mineral water blend and a bifidobacterium probiotic agent that overcomes the problems of prior agents, which problems include selectivity of the agent over other intestinal flora, limiting digestion, and absorption of the agent in the upper digestive tract.

An object of the invention is to provide beverages comprising minerals and trace elements, along with a selective bifidobacterium probiotic agent to provides continuing mineral and trace element nutrition and intestinal health to those who consume it.

Another object of the invention is to provide compositions which are additive to beverages and foods for man and other animals.

It is an object of the present invention to provide a combination of mineral ions, mineral and trace element complexes, as well as a bifidobacterium probiotic agent that together promote the well being of the user, by allowing the uptake of acidic vitamins, and the uptake of silicon in the form of a silica dioxide.

It is another object of the present invention to maintain the solubilization of the minerals and trace elements, by including chemical agents that chelate or complex the ions in solution, thereby preventing precipitation, and enhancing absorption.

It is still another object to provide a new beverage containing the mineral water blend and bifidobacterium probiotic agent that can be used with a variety of different carriers and foodstuffs.

It is yet another object of the present invention to provide a means for providing both concentrates and dilutions of the beverage or composition over a wide range of concentrations.

It is still yet another object of the present invention to provide for an inexpensive composition that is simple, user-friendly, requires minimal preparation, and that can be freely utilized across a broad range of carriers and foods.

The aforementioned background has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following written disclosure of the Detailed Description of the Invention.

SUMMARY OF THE INVENTION

The present invention is directed to dietary mineral composition comprising a health promoting dose of a mineral and trace element blend combined with a bifidobacterium probiotic agent. The concentration range of the chemical components in the preferred embodiment are: from about 1% w/w to about 10% w/w of a bifidobacterium probiotic agent; from about 10% w/w to about 90% w/w of a edible, water soluble composition of mineral salts and trace elements, preferably 44% w/w or 83% w/w of TRASEA 19; from about 0.1% w/w to about 10% w/w of a carboxylic acid, preferably a tricarboxylic acid such as 3% w/w citric acid; and from about 0.1% w/w to about 20% of a mineral acid, preferably 8% w/w sulfuric acid.

An alternative composition is further comprised of: from about 0.1% w/w to about 10% w/w of an amorphous silica dispersion, colloidal silica dispersion of aggregated silica, or colloidal dispersion of crystalline silica, where the amorphous spherical particle size ranges from about 4 nm to about 100 nm, preferably 10 nm; and from about 0.001% w/w to about 1% w/w of an acidic vitamin, preferably 0.01% w/w ascorbic acid.

Both the preferred and alternative embodiments may be further comprised of: from about 0.001% w/w to about 0.1% w/w of an acidic protease enzyme, preferably 0.01% w/w pepsin for the preferred embodiment, and preferably 0.005% w/w pepsin for the silica containing alternative embodiment; from about 0.02% w/w to about 2% w/w of a protein or peptide digest, preferably 0.2% w/w PolyPro 5000® hydrolyzed collagen or 0.1% w/w N-Z-Amine® enzymatic hydrolysate of milk protein (casein digest); from about 0.0005% w/w to about 0.05% w/w each of three amino acids, preferably 0.005% w/w each of the L-isomers of arginine, carnitine and ornithine; from about 0.005% w/w to about 0.5% w/w of acidulant vinegar, preferably 0.025% w/w or 0.05% w/w of rice vinegar; and from about 0.015% w/w to about 1.5% w/w of a preservative, preferably 0.15% w/w/ sodium benzoate.

Either embodiment is in a form mixable with a carrier, to form a beverage. The carrier can be water, fruit juices, teas, dairy products, alcoholic drinks, sodas, electrolyte replacement solutions, and other edible liquids. The composition can be orally consumed by the user as a concentrate directly, or consumed as a dilution (e.g. as a beverage), wherein the dilution factor ranges from about 1:2 to about 1:10,000 or to the taste of the individual consumer. The concentrate may be added, i.e. diluted to solid or semi-solid (e.g. sauces) foodstuffs. The present invention is contrary to other bifidobacterium promoting art, which usually place the bifidobacteria directly into the food; see Kurmann et al., "Bifidobacteria in Foods", Encyclopedia of Food Science, Food Technology and Nutrition, (1993); or Hughes et al., "Bifidobacteria: Their Potential For Use In American Dairy Products", Food Technology (April 1991).

DETAILED DESCRIPTION OF THE INVENTION

Among the utilities of the present invention, the compositions of the present invention are compositions useful for establishing and maintaining a healthy digestive system by reducing pathogenic microorganisms and their toxins, thereby allowing edible co-consumed mineral and trace elements to be absorbed by the intestines. Such composition are combinations of mineral water blends, bifidobacteria probiotic agents, and various acidulants, acidic vitamins, mineral chelators, complexors or binders that facilitate the absorption of these minerals and elements by the intestines. Such combinations may be in any form suitable for mixing with a liquid to form the mineral/trace element/bifidobacteria probiotic agent/water soluble combination or suspension for oral consumption. The preferred form is a concentrate from which several drops are dispensed which readily mix and disperse in any liquid beverage, or may be sprinkled over or mixed with other solid or semi-solid foodstuffs. Suitable beverages include but are not restricted to any beverage suitable for human consumption such as water, seltzers, fruit juices, artificially-flavored fruit drinks, vegetable juices, brewable teas, instant teas, green teas, milk, dairy liquids, dairy products, dairy drinks, soy products, soy drinks, soy sauce, liqueurs, wines, wine coolers, alcoholic liquids, electrolyte replacement solutions, carbonated sodas, soft drinks, infant formula, mother's milk and other drinkable liquids and solutions.

The levels of edible mineral water blend and bifidobacteria probiotic agent disclosed herein are based on a chemically and dietetically compatible, palatable concentration of a commercially available trace mineral water dietary supplement, from about 10% w/w to about 90% w/w. The units of % w/w are defined as "grams of component added" per "100 grams of total components added."

Also included in the present invention are compositions which vary in delivered amount of minerals and trace elements, or amount of bifidobacteria probiotic agent, or both. Such compositions may be formulated by varying the weight of any single chemical components in proportion to the total weight of all components disclosed herein.

The components of the compositions according to the present invention, and representative amounts, are described in detail as follows.

Mineral Water

Mineral waters or mineral water blends for use in the compositions of the invention are preferably derived from marine, terrestrial, or fresh water sources and contain a substantial number of dissolved minerals and trace elements. Of the approximate 80 elements found in such water, about 24 are essential for proper nutrition and health. Mineral water blends are commercially available in specialty nutrition stores, and are well known to those skilled in the art. One commercial example is TRASEA™ 19 manufactured by Nutritional Engineering, Inc. of Carlsbad, Calif., which is a refined mineral and trace element water taken from the Pacific Ocean. TRĀSEA™ 19 and other mineral waters generally contain about 37 detectable minerals and elements. Other elements may be present in the mineral water, but are below the detectable concentration of the chemical quantization method. The concentration range for a mineral water blend, such as TRĀSEA 19 in the present invention and embodiments is from about 10% w/w to about 90% w/w, with a preferred concentration of about 83% w/w in the preferred embodiment, and about 44% w/w in an alternative embodiment containing silica. It should be understood that synthetic mineral water blends which mimic water blends of marine, fresh water, or terrestrial sources also find use in the compositions of the invention. Methods for making synthetic mineral water blends are well known in the art, for example, in the art of making salt water trace mineral blends for marine aquaria.

Table 1 illustrates a typical chemical analysis of TRĀSEA™ 19 with concentrations of detectable component minerals and elements stated in units of parts per million (ppm, milligrams per liter).

TABLE 1

Detectable Minerals and Trace Elements in TRASEA 19

| Mineral or Element | [ppm] | Mineral or Element | [ppm] |
|---|---|---|---|
| carbon (total) | 1200 | fluoride | 0.11 |
| nitrogen | 410 | vanadium | 0.09 |
| magnesium | 320 | indium | 0.08 |
| sulfur | 180 | arsenic | 0.04 |
| potassium | 170 | cerium | 0.04 |
| sodium | 36 | molybdenum | 0.02 |
| iron | 13.9 | cesium | 0.02 |
| chloride | 13 | bromide | 0.02 |
| zinc | 11.9 | aluminum | 0.02 |
| manganese | 10.8 | scandium | 0.02 |
| iodine | 3.9 | silver | 0.01 |
| boron | 2.9 | selenium | 0.01 |
| copper | 2.22 | praseodymium | 0.01 |
| silicon | 1.4 | strontium | 0.01 |
| calcium | 0.72 | rhodium | 0.007 |
| geranium | 0.65 | dysprosium | 0.007 |
| phosphorus | 0.39 | barium | 0.005 |
| lithium | 0.22 | gold | 0.002 |
| chromium | 0.2 | | |

Bifidobacteria Probiotic Agents

In the compositions of the invention, gluconic acid, lactone derivatives and salts thereof represent the preferred sugar acid, or more specifically a monosaccharide sugar acid acting as a bifidobacterium probiotic agent. Gluconic acid (which is one of several structurally similar aldonic acids, salts of aldonic acids, or lactones of aldonic acids) is the only known member of this group which possesses bifidobacterium probiotic activity. These compounds are chemically similar to ketonic acids, salts of ketonic acids and lactones of ketonic acids. It is understood that compounds which have bifodobacterium probiotic activity are included in the scope of bifidoprobiotic agents for use in the compositions of the invention.

Gluconic acid is added to the mineral water blend in the lactone derivative form as glucono-delta-lactone, a precursor that converts to gluconic acid when aqueous. As described in Asano et al., U.S. Pat. No. 5,605,697, gluconic acid, its salts and lactone derivatives such as glucono-delta-lactone, are the "bifidus factors", the sugar acids that promote growth of bifidobacterium with good selectivity over other intestinal microbes. U.S. Pat. No. 5,605,697 is expressly incorporated herein by reference. Gluconic acid and glucono-delta-lactone are both commercially available from Sigma Chemical Company, St. Louis, Mo. The concentration range for glucono-delta-lactone in the present invention and embodiments is from about 1% w/w to about 20% w/w, with a preferred concentration of about 6% w/w in the preferred embodiment, and 3% w/w in the silica-containing alternative embodiment.

Fructo-oligosaccharides are a type of fructosyl-containing oligosaccharides. As used herein the term "fructosyl-containing oligosaccharide" is meant to include rearrangement products resulting from the method of the invention described in Whistler et al., U.S. Pat. No. 5,843,922 issued Dec. 1, 1998. Such rearrangement products include, without limitation: 1-kestose, 6-kestose, neokestose, fructo-oligosaccharides, difructose dianhydrides, fructosans, fructoglucans, and mixtures thereof. For all that it teaches about "frutosyl-containing oligosaccharides", their manufacture, and their use in promoting the growth of bifidobacteria, the disclosure of U.S. Pat. No. 5,843,922 is expressly incorporated herein by reference. The concentration range for fructo-oligosaccharides in the present invention and embodiments is from about 1% w/w to about 20% w/w, with preferred concentrations of about 3 or 6% w/w.

Carboxylic Acids

Edible carboxylic acids complex or bind to the some of the mineral ions and trace elements thereby buffering the minerals during digestion and assimilation in the intestines. Monocarboxylic acids weakly associate with the mineral ions, while di- and tricarboxylic acids actually chelate to the mineral ions. Chelate formation occurs when a metal ion is bound to two or more donor atoms in a single ligand, such as with di- or tri-carboxylic acids. Representative dicarboxylic acids are alpha-ketoglutarate, succinate, fumarate, malate, oxaloacetate, their salts and derivatives. Representative tricarboxylic acids are citrate, cis-aconitate, isocitrate, their salts and derivatives. The concentration range for a carboxylic acid, such as citric acid (which is preferred) in the embodiments of the present invention is from about 0.1% w/w to about 10% w/w, with a preferred concentration of about 3% w/w.

Strong Acidulant: Mineral Acids

Mineral acids are used to acidify the compositions of the present invention, and are all commonly available from chemical supply houses, including Sigma Chemical Company, St. Louis, Mo. These mineral acids must meet Food Chemical Codex (FCC) U.S. Pharmacopea (USP) or National Formulary (NF) specifications. Mineral acids that meets these requirements are sulfuric acid, phosphoric acid, hydrochloric acid and nitric acid. Sulfuric and phosphoric are preferred in the compositions of the invention. The concentration range for a mineral acid in the present invention and its embodiments are from about 0.1% w/w to about 20% w/w, with a preferred concentration of about 8% w/w.

Acidic Vitamins

The only acidic vitamin used in the compositions of the present invention is ascorbic acid (vitamin C), its ascorbate salts, isomers and derivatives. Vitamin C is contained in the invention because it is an edible acid and its immunostimulant derivatives play an important part in cell regulation. It is also able to complex or bind to some of the mineral ions from the mineral water blend, thereby contributing to the solubilization of the minerals, and mineral absorption by the intestines. Ascorbic acid, its salts, isomers and derivatives are commercially available from Sigma Chemical Company of St. Louis, Mo. The concentration range for ascorbic acid in the present invention is from about 0.001% w/w to about 1% w/w, with a preferred concentration of 0.01% w/w.

Silicon and Silica

Dietary silicon promotes proper growth and strong bones and connective tissue (Nielsen, F. H. in Prasad, A. S., ed. Essential and Toxic Trace Elements in Human Health and Disease: An Update:355–376. New York: Wiley-Liss, 1993). A novel aspect of the present invention involves a composition which overcomes the absorbtive barrier of the intestine to the delivery of nutritional silica. The compositions of the present invention deliver bioavailable silica in a stable, colloidally dispersed form via absorption through the intestine. Orally administering the compositions of the invention to humans or animals is the basis for a method of the invention for delivering bioavailable or bionutrient silica.

Particles of colloidal silica dispersions are commercially available as NYACOL® 830 Colloidal Silica from Eka Chemicals of Marietta, G., as well as other vendors (e.g. DuPont, Nalco, Huls). This silica is an alkaline, aqueous dispersion of colloidal silica at a 30% concentration. The Grade 830 dispersed silica is present as amorphous spheres, 10 nm in size. The particles carry a slightly negative surface charge and have a high surface area-to-weight ratio. NYACOL® 830 is an opalescent liquid, slightly more viscous than water. An alternative embodiment of the present invention contains a dispersion of NYACOL® colloidal silica particles having a spherical size range of from about 4 nm (Grade 215) to about 100 nm (Grade 9950), with a preferred spherical particle size of 10 nm (Grade 830). The silica delivery system of the invention, i.e. the compositions comprising silica disclosed herein, is based on the advantageous use of colloidal silica, which as a very low charge density per unit particle. The low charge density prevents or minimizes the aggregation or crystallization of the silica, thus providing a system for absorptive delivery of bionutrient silica through the intestine. This delivery system of the invention overcomes the barrier to absorption of bionutrient silica caused by charges that form on these small silica particles, especially in an acid environment, which allows the particles to aggregate and form what are termed colloids or aggregations, which are not absorbed or minimally absorbed through the intestine.

The concentration range for silica in the silica-containing alternative embodiment is from about 0.1% w/w to about 8% w/w, with a preferred concentration of 1.8% w/w.

In addition to silica derived from the herb horse tail, another biological source of colloidal silica for use in the compositions and methods of the invention is reported in C&EN, Nov. 8, 1999, p. 19, and involves the use of peptides extracted from the cells walls of diatoms to generate networks of silica nonospheres. Recombinant organisms comprising the genetic determinants of these peptides is also contemplated as a source of silica for use in the present invention.

Amino Compounds

As used herein, the term "amino compounds" refers to amino acids, peptides, oligopeptides, proteolytic digestion products of proteins, and proteins.

Acidic Proteases: The preferred acidic protease for use in an embodiment of the invention is pepsin. It is the principal proteolytic enzyme of vertebrate gastric juice. Its inactive zymogen precursor, pepsinogen is produced in the stomach mucosa. Pepsinogen activates to pepsin below pH 5, which is easily achieved in the present invention. Therefore pepsinogen could be substituted for pepsin, and it would quickly convert to pepsin upon dissolution in this acidified mineral water composition. The optimal pH for pepsin is about 1.0 for native substrates such as casein or hemoglobin. The source of this pepsin is from porcine stomach mucosa, and it is commercially available from Sigma Chemical Company of St. Louis, Mo. Pepsin, which is amino compound (as defined above) is a proteolytic enzyme tolerant to low pH, thereby assisting in the digestive process located in the intestines. The concentration range for pepsin in the preferred embodiment is from about 0.001% w/w to about 0.1% w/w, with a preferred concentration of 0.01% w/w of pepsin. The concentration range for pepsin in the alternative silica embodiment is from about 0.0005% w/w to about 0.05% w/w, with a preferred concentration of 0.005% w/w of pepsin.

Protein or Peptide Digests

The preferred protein or peptide digests are PolyPro 5000™ for the preferred embodiment, and N-Z-Amine™ for the silica containing alternative embodiment comprising ascorbic acid and a dispersion of amorphous spherical silica particles. PolyPro 5000™ is hydrolyzed collagen comprised of peptides with an average molecular weight of 5000 daltons and amino acids. N-Z-Amine™ is a digest of enzymatically hydrolyzed casein protein (milk protein). The function of the protein or peptide digests is to provide solubilizers to minimize trace mineral precipitation and to enhance transport of trace minerals across the cell membranes of intestinal villi and into the bloodstream.

These protein digests are utilized as a nutrient media for the bacteria resident in the large intestine, and to improve the texture and palatability of the composition. These edible protein digests are also useful for the formation and maintenance of bone, skin and cartilage. PolyPro 5000™ is commercially available from Leiner Davis Gelatin of Davenport, Iowa. N-Z-Amine™ is commercially available from Quest International (Hoffinan Estates, Ill.). In the embodiments of the invention, PolyPro 5000™ has a concentration range of from about 0.02% w/w to about 2% w/w, with a preferred concentration of 0.2% w/w in the preferred embodiment. N-Z-Amine™ soluble peptide composition is utilized at a concentration range from about 0.01% w/w to about 1% w/w, with a preferred concentration of 0.1% w/w in the silica containing alternative embodiment.

Amino Acids

The amino acids blended into alternative silica embodiments of the present invention are the L-isomers of arginine, ornithine and carnitine. Their respective chemical structures are: $H_2N-C(=NH)-NH-(CH_2)_3-CH-(NH_2)-COOH$; $NH_2-CH(-CH_2-CH_2-CH_2-NH_2)-COOH)$; and $(CH_3)_3-N-CH_2-CH(OH)-CH_2-COOH$. These three amino acids are included because of their ability to complex or bind the minerals or elements contained in the alternative silica compositions, and for their role in the formation and maintenance of bone, skin and cartilage. All three of these amino acids are commercially available from Sigma Chemical Company. They all have a concentration range of about 0.0005% w/w to about 0.005% w/w, with a preferred concentration of 0.005% w/w.

Mild Acidulants

Mild Acidulants are used to gently acidify a food stuff or liquid during preparation. The acidulants in embodiments of the invention include but are not restricted to vinegar, rice vinegar, white vinegar, derivatives of vinegar, concentrates and dilutions thereof. Rice vinegar is the preferred acidulant, and is thought to have special nutritive properties in several cultures. These vinegars are available from common supply houses. The concentration range for this acidulant is from about 0.005% w/w to about 0.5% w/w, with a preferred concentration of 0.05% w/w.

Food Grade Preservatives

Any food grade preservative may be used in the compositions of the invention. Preferred preservatives used in these embodiments of the present invention are benzoic acid, benzoate salts such as sodium benzoate, and derivatives of benzoic acid. Examples of derivatives are propylparaben, and methylparaben. The role of these preservatives are to inhibit microbial growth in the mineral water blend / bifidobacterium probiotic agent. All of these preservatives are commercially available from Sigma Chemical Company. They can be used over a broad concentration range from about 0.015% w/w to about 1.5% w/w, with a preferred concentration of 0.15% w/w.

Carriers

The present invention may be diluted with one or more carriers, preferably beverages. Suitable carriers must be safe for oral administration to humans, and may be chosen by one of ordinary skill in the art as appropriate for this composition and use intended for the product.

A carrier is a liquid that the compositions of the present invention may be added to, and/or substantially homogeneously diluted or mixed into. Most carriers are common drinks and liquids, and when mixed with the present invention the result is a beverage containing the mineral and trace elements, bifidobacterium probiotic agent, citric acid, sulfuric acid. When mixed with the embodiment comprising silica, the beverage further comprises silica and ascorbic acid.

Suitable carriers herein, depending on desired properties and intended end use, are selected from one or more of the following carriers, which include but are not restricted to water, seltzers, fruit juices, artificially-flavored fruit drinks, vegetable juices, brewable teas, instant teas, green teas, milk, dairy liquids, dairy products, soy products, soy sauce, beers, liqueurs, wines, wine coolers, alcoholic liquids, electrolyte replacement solutions, carbonated sodas, soft drinks, and other drinkable liquids and solutions.

The concentrate of the present invention is added to the carrier so as to make a dilution from about a factor of 1:2 to about a factor of 1:10,000, or in quantities sufficient to achieve desired formulation characteristics according to the formulator's preference.

Method of Preparation and Use

The method of preparation and use comprises a step of blending into a mineral water blend at least one carboxylic acid, preferably citric acid; a bifidobacteria probiotic agent, such as a sugar acid, preferably gluconic acid or glucono-delta-lactone (which converts to gluconic acid when aqueous); and at least one mineral acid, preferably sulfuric acid to form a second blend. The silica-containing alternative embodiment, which further comprises an acidic vitamin, preferably ascorbic acid, and a silica dispersion, preferably of NYACOL® 830 Colloidal Silica., is formed in a further blending step which involves mixing into the second blend in any order ascorbic acid or derivatives, and salts thereof and a silica dispersion.

Either of these composition embodiments are then administered in a "safe and effective amount" to the subject or user, preferably administered orally as a nutritional supplement. The term "safe and effective amount," as used herein, means an amount of the mineral water composition sufficient to significantly and positively promote the bifidobacterium culture in the subject's colon, thereby maintaining or improving the health of the colon and digestive system, so that mineral and trace elements are properly absorbed as needed, but low enough to avoid serious side effects at a reasonable benefit/risk ratio. The safe and effective amount will vary with age and physical condition of the user, the nature of the digestive condition, the current number and mix of intestinal bacteria, the duration of the treatment, the nature of concurrent therapy.

EXAMPLES

The following examples are given solely for the purpose of illustration and are not to be construed as limitations of the present inventions as many variations thereof are possible without departing from the spirit and scope.

Example 1.
Preferred Embodiment

| Chemical Component | Concentration, % w/w |
| --- | --- |
| Mineral and trace element blend, as TRĀSEA 19 | 83% |
| Bifidobacterium probiotic agent, as a lactone of a sugar acid (glucono-delta-lactone) | 6% |
| Carboxylic acid, as citric acid | 3% |
| Mineral acid, as sulfuric acid | 8% |

Example 2.
Preferred Embodiment with Additional Agents

| Chemical Component | Concentration, % w/w |
| --- | --- |
| (All components from Example 1 above) | 99.775% |
| Acidic protease, as pepsin | 0.01% |
| Hydrolyzed collagen, as PolyPro 5000 ® | 0.02% |
| Acidulant, as rice vinegar | 0.05% |
| Preservative, as sodium benzoate | 0.15% |
| Amino acid, as L-carnitine | 0.005% |
| Amino acid, as L arginine | 0.005% |
| Amino acid, as L ornithine | 0.005% |

Example 3
Silica—Containing Embodiment

| Chemical Component | Concentration % w/w |
| --- | --- |
| Mineral and trace element blend, as TRĀSEA 19 | 44% |
| Bifidobacterium probiotic agent, as a lactone of a sugar acid (glucono-delta-lactone) | 3% |
| Carboxylic acid, as citric acid | 1.5% |
| Mineral acid, as sulfuric acid | 8% |
| Acidic vitamin, as ascorbic acid | 0.01% |
| Silica dispersion, as NYACOL ® Colloidal Silica | 1.8% |

Example 4.
Silica Containing Alternative Embodiment with Additional Agents

| Chemical Component | Concentration % w/w |
| --- | --- |
| (All components from Example 3 above) | 99.72% |
| Acidic protease, as pepsin | 0.005% |
| Enzymatically hydrolyzed casein, as N-Z-Amine ® | 0.1% |
| Acidulant, as rice vinegar | 0.025% |
| Preservative, as sodium benzoate | 0.15% |
| Deionized water | 41.69% |

Compositions of the invention have been administered orally and topically to individual subjects under the supervision of health care professionals. The results of administering the silica compositions to humans include: rapid stabilization of asthmatic subjects; stabilization of diabetic subjects; amelioration of side-effects of chemotherapy in cancer patients; and swifter recovery times for athletes after high stress workouts. Topical application of the compositions of the invention to skin cancer stabilized the condition.

Although the present invention has been described in such a way that those skilled in the art are able to reproduce the invention, it is believed that further modifications and changes can be made to the invention without departing from the spirit thereof and it is intended to include all such changes and modifications as come within the scope of the claims appended hereto.

What is claimed is:

1. A mineral water composition, said mineral water composition comprising:
    (a) at least one carboxylic acid, said carboxylic acid comprising about 0.1% w/w to about 10% w/w;
    (b) a bifidobacterium probiotic agent, said bifidobacterium probiotic agent comprising about 1% w/w to about 20% w/w; and
    (c) at least one mineral acid, said mineral acid comprising about 0.1% w/w to about 20% w/w.

2. The composition of claim 1, wherein said carboxylic acid is selected from a group consisting of monocarboxylic, dicarboxylic, tricarboxylic acids, salts and derivatives thereof.

3. The composition of claim 2, wherein said dicarboxylic acid is selected from a group consisting of alpha-ketoglutarate, succinate, fumarate, malate, oxaloacetate, salts and derivatives thereof.

4. The composition of claim 2, wherein said tricarboxylic acid is selected from a group consisting of citrate, cis-aconitate, isocitrate, salts and derivatives thereof.

5. The composition of claim 1, wherein said bifidobacterium probiotic agent is selected from a group consisting of fructo-oligosaccharides, sugar acids, and lactones of a sugar acid.

6. The composition of claim 5, wherein said sugar acid is selected from a group consisting of gluconic acid, monosaccharide sugar acids, salts and derivatives thereof.

7. The composition of claim 5, wherein said sugar acid is selected from a group consisting of aldonic acids, salts of said aldonic acids, lactones of said aldonic acids, ketonic acids, salts of said ketonic acids, and lactones of said ketonic acids, wherein either selection has bifidobacterium promoting properties.

8. The composition of claim 7, wherein at least one of said lactones of said aldonic acids is glucono-delta-lactone, therein forming gluconic acid when aqueous.

9. The composition of claim 5, wherein said sugar acid is selected from a group consisting of aldonic acids, salts of said aldonic acids, lactones of said aldonic acids, ketonic acids, salts of said ketonic acids, and lactones of said ketonic acids, wherein said selection has bifidobacterium promoting properties.

10. The composition of claim 1, wherein said mineral acid is selected from a group consisting of hydrochloric, nitric, phosphoric and sulfuric.

11. The composition of claim 1 further comprising one or more amino compounds selected from the group consisting of pepsin, protein digests, peptide digests, hydrolyzed collagen, enzymatically hydrolyzed casein, L-carnitine, L-arginine and L-ornithine, salts and derivatives thereof.

12. The composition of claim 11 further comprising one or more mild acidulants selected from the group consisting of vinegar, rice vinegar, white vinegar, vinegar derivatives, concentrates and dilutions thereof.

13. The composition of claim 12 further comprising a food preservative agent.

14. The composition of claim 13 wherein said food preservative agent is selected from the group consisting of benzoic acid, sodium benzoate, and salts and derivatives thereof.

15. The composition of claim 1, further comprising a silica dispersion.

16. The comnposition of claim 15, further comprising an acidic vitamin selected from the group consisting of ascorbate isomers, ascorbate salts and ascorbate derivatives thereof.

17. The composition according to claim 15, wherein said silica dispersion comprises from about 0.1% w/w to about 8% w/w.

18. The composition of claim 17 wherein said silica dispersion is selected from a biological source or a recombinant biological source.

19. The composition of claim 15 wherein said silica dispersion is substantially colloidal silica.

20. The composition of claim 15, wherein said silica dispersion is formed of substantially spherical particles.

21. The composition of claim 15, wherein said silica dispersion is about 4 nm to about 100 nm in particle size diameter.

22. The composition of claim 15, further comprising one or more amino compounds selected from the group consisting of pepsin, pepsinogen, protein digests, peptide digests, hydrolyzed collagen, enzymatically hydrolyzed casein, salts and derivatives thereof.

23. The composition of claim 15, further comprising one or more mild acidulants selected from the group consisting of vinegar, rice vinegar, white vinegar, vinegar derivatives, concentrates and dilutions thereof.

24. The composition of claim 23, further comprising a food preservative agent.

25. The composition of claim 23 wherein said food preservative agent is selected from the group consisting of benzoic acid, sodium benzoate, salts and derivatives thereof.

26. The composition of claim 15, further comprising a carrier into which said composition is diluted in the range of about 1:2 to about 1: 10,000 to produce a beverage.

27. The composition of claim 26, wherein said carrier is selected from the group consisting of water, seltzers, fruit juices, vegetable juices, tea, soy sauce, soy products, electrolyte replacement solutions, wine, wine coolers, beer, alcoholic drinks, carbonated drinks, sodas, milk, and dairy drinks.

28. A beverage composition, the beverage composition comprising:
    (a) about 44% w/w of a mineral and trace element blend of mineral water;
    (b) about 1.5% w/w of citric acid;
    (c) about 3% w/w of glucono-delta-lactone, therein forming gluconic acid when aqueous;
    (d) about 8% w/w of sulfuric acid;
    (e) about 0.01% w/w ascorbic acid;
    (f) about 1.8% w/w colloidal silica dispersion; and
    (g) about 41.69% w/w deionized water.

29. The composition of claim 28, further comprising:
    (a) about 0.005% w/w pepsin;
    (b) about 0.1% w/w enzymatically hydrolyzed casein (N-Z-Amine);
    (c) about 0.025% w/w vinegar;

(d) about 0.15% w/w sodium benzoate; and (g) about 41.41% w/w deionized water.

30. A beverage composition comprising:
   (a) about 83% of mineral water trace element blend;
   (b) about 3% of citric acid;
   (c) about 6% of glucono-delta-lactone, therein forming gluconic acid when aqueous; and
   (d) about 8% of sulfuric acid.

31. The composition of claim 30, further comprising:
   (a) about 0.01% pepsin;
   (b) about 0.2% soluble peptide;
   (c) about 0.05% rice vinegar;
   (d) about 0.15% sodium benzoate;
   (e) about 0.005% L-carnitine;
   (f) about 0.005% L-arginine; and
   (g) about 0.005% L-ornithine.

32. A diluted mineral water beverage composition, comprising:
   (a) a mineral water blend, said blend comprising:
      (i) at least one carboxylic acid, said carboxylic acid comprising about 0.1% w/w to about 10% w/w;
      (ii) a bifidobacterium probiotic agent, said bifidobacterium probiotic agent comprising about 1% w/w to about 20% w/w;
      (iii) a bifidobacterium probiotic agent, said bifidobacterium probiotic agent comprising about 1% w/w to about 20% w/w; and
      (iv) at least one mineral acid, said mineral acid comprising about 0.1% w/w to about 20% w/w; and
   (b) a carrier into which said blend is diluted in the range of about 1:2 to about 1:10,000 to produce a beverage.

33. The composition of claim 32, wherein said carrier is selected from a group consisting of water, seltzers, fruit juices, vegetable juices, green tea, brewable tea, instant tea, soy sauce, soy products, electrolyte replacement solutions, wine, wine coolers, beer, alcoholic drinks, sodas, carbonated drinks, milk, dairy products, and dairy drinks.

34. The composition of claim 32 further comprising a silica dispersion.

35. A method of delivering a diluted mineral water composition to a human or animal, said method comprising the steps of:
   (a) blending into a first mineral water blend at least one carboxylic acid, said carboxylic acid comprising about 0.1% w/w to about 10% w/w; a bifidobacterium probiotic agent, said bifidobacterium probiotic agent comprising about 1% w/w to about 20% w/w; and at least one mineral acid, said mineral acid comprising about 0.1% w/w to about 20% w/w; to form a second blend;
   (b) diluting the second blend with water in a ratio of 1:2 to about 1:10,000 of the second blend to water; and
   (c) administering the second blend to said human or animal.

36. The method of claim 35, wherein said blending further comprises the step of mixing into said second blend a silica dispersion.

37. A method of delivering bionutrient silica to a human or animal, said method comprising the step of orally administering to said human or animal a mineral water composition comprising silica in colloidally dispersed form, said silica comprising about 0.1% w/w to about 8% w/w.

38. The method of claim 37 wherein said mineral water composition further comprises:
   (a) at least one carboxylic acid, said carboxylic acid comprising about 0.1% w/w to about 10% w/w;
   (b) a bifidobacterium probiotic agent, said bifidobacterium probiotic agent comprising about 1% w/w to about 20% w/w; and
   (c) at least one mineral acid, said mineral acid comprising about 0.1% w/w to about 20% w/w.

* * * * *